United States Patent [19]

Tanaka

[11] Patent Number: 5,323,328
[45] Date of Patent: Jun. 21, 1994

[54] SYSTEM FOR CONTROLLING POWER GENERATING PLANT HAVING A PLURALITY OF UNITS IN ACCORDANCE WITH DISTRIBUTED COMPUTER SYSTEM

[75] Inventor: Shuntaro Tanaka, Musashino, Japan

[73] Assignee: Kabushiki Kaisha Toshiba, Kawasaki, Japan

[21] Appl. No.: 785,289

[22] Filed: Oct. 30, 1991

[30] Foreign Application Priority Data

Oct. 31, 1990 [JP] Japan .................................. 2-291910

[51] Int. Cl.[5] .............................................. G06F 15/56
[52] U.S. Cl. ..................................... 364/492; 364/494; 395/907
[58] Field of Search ................ 364/492; 395/915, 907; 60/39.13, 39.3

[56] References Cited

U.S. PATENT DOCUMENTS

| | | | |
|---|---|---|---|
| 4,118,635 | 10/1978 | Barrett et al. | 290/40 R |
| 4,253,148 | 2/1981 | Johnson et al. | 364/200 |
| 4,264,960 | 4/1981 | Gurr | 364/492 |
| 4,305,129 | 12/1981 | Yannone et al. | 364/492 |
| 4,443,861 | 4/1984 | Slater | 364/492 |
| 4,550,379 | 10/1985 | Kawai et al. | 364/494 |
| 4,563,746 | 1/1986 | Yoshida et al. | 364/492 |
| 4,932,204 | 6/1990 | Pauel et al. | 60/39.02 |
| 5,200,744 | 4/1993 | Hiromoto et al. | 340/825.15 |

OTHER PUBLICATIONS

IEEE Transactions on Energy Conversion, vol. 6, No. 1, Mar. 1991 "Integration of Steam Turbine Controls into Power Plant Systems"-J. Kure Jensen.
IEEE Computer Applications in Power-1988, "Highlights of the Guri Hydroelectric Plant Computer Control System"-Beltran et al.

Primary Examiner—Thomas G. Black
Assistant Examiner—Tan Q. Nguyen
Attorney, Agent, or Firm—Foley & Lardner

[57] ABSTRACT

A power generating plant control system for collectively operating and controlling a power generating plant having a plurality of generating units with unit controllers provided in correspondence with respective generating units belonging to the generating plant and having control logics for applying special purpose operations to control systems of the respective generating units, data servers provided in correspondence with the unit controllers of the respective generating units and for processing and retaining control data and supervisory data of the respective generating units, and a central supervisory control system adapted to input data of the respective data servers through a data bus to carry out supervisory control of the operating states of the respective generating units, and to give start/stop instructions or load operating instructions to the respective generating units.

6 Claims, 6 Drawing Sheets

SYSTEM FOR CONTROLLING POWER GENERATING PLANT HAVING A PLURALITY OF UNITS IN ACCORDANCE WITH DISTRIBUTED COMPUTER SYSTEM

BACKGROUND OF THE INVENTION

This invention relates to a power generating plant control system for collectively operating and controlling a power generating plant having a plurality of power generating units, and more particularly to a system for controlling in a distributed manner power generating units in a large scale power generating plant by microcomputers provided in every unit.

For example, thermal power generating plants generate steam by means of a boiler by using petroleum, coal or LNG, etc as fuel to introduce this steam into the turbine to rotate the power generator, thus to generate an electric power. Meanwhile, there are instances where such a power generating system is comprised of small scale generating units to use these plural power generating units as a single large scale power generating plant. In order to control the respective generating units in such a power generating plant, it is required to operate or manipulate a large number of equipments in accordance with a complicated procedure. For this reason, ordinarily a large number of plant operators or a large scale automatic system are required such that an operating procedure is stored into the process computer being used.

FIG. 1 is a block diagram showing the entire configuration of a typical power generating plant comprised of a plurality of generating units. In order to operate the power generating unit to generate an electric power output, the following procedure is basically taken.

For the purpose of generating steam, a steam turbine 109 is driven at the number of revolutions of 3000 rpm (or 3600 rpm). Steam thus generated is collected into a condenser 100, at which it is cooled by using sea water. Water cooled at the condenser 100 is delivered from a low-pressure heater 102 to a deaerator 103 by means of a condensate pump 101 through a condensate line 100b. Water subjected to vacuum heat deaeration at the deaerator 103 is delivered to a feed water pump 104 through a feed water line 103a, and is pressurized by the feed water pump 104. Water thus pressurized is delivered from a high-pressure heater 105 to a boiler 106.

In the arrangement of FIG. 1, there is provided a system such that condensed water is returned from the deaerator 103 to the condenser 100 through the line 103b, the internal portion of the boiler 106 and the line 106a, and that feed water is delivered from the exit of the high-pressure heater 105 to the deaerator 103 through the line 105a to the condenser 100 through the internal portion of the boiler 106 and the line 106a. Thus, water can be circulated within the system at the middle stage of starting the unit.

Temperature of water admitted into the boiler 106 is elevated by means of a burner, resulting in high temperature and high pressure steam. The steam from the exit of the boiler 106 goes through a main steam line 106b and is controlled by a steam control valve 107 and a main steam stop valve 108. Thereafter, steam is delivered into the turbine 109. At this time, steam is controlled mainly by the steam control valve 107 so that predetermined rotational frequency is reached.

The rated rotational frequency of the turbine 109 is determined by the frequency of the output of a power generator 110. Namely, the turbine 109 is controlled so that the rated rotational frequency thereof becomes equal to 3000 rpm in the area of the frequency of 50 Hz, and that it becomes equal to 3600 rpm in the area of the frequency of 60 Hz.

The power generator 110 is coupled to the turbine 109 through the central shaft thereof, and the power generator 110 and the turbine 109 rotate at the same number of rotations. Thus, a predetermined generated electric power output is stepped up to the same voltage as the voltage of the power system by a main transformer 112 through a main breaker 111. The voltage thus stepped up is sent to a transmission line 114 of the electric power system through a line breaker 113.

The operation of the power generation unit is basically carried out in accordance with the procedure as stated above. Although not shown in FIG. 1, there are also included a sea water cooling system used for cooling at the condenser 100, a fuel system for carrying out combustion by the burner to heat water at the boiler 106, and an air draft system.

It is to be noted that since a series of procedures for carrying out transformation from water to steam, and transformation from steam to electricity in the entire power generating unit are complex, the configuration corresponding thereto is not included for avoiding such a complexity in FIG. 1.

The power generating unit started and operated in accordance with the above-described procedure is subject to supervisory control by a plurality of operators by using respective dedicated control devices in connection with the control ranges classified as follows.

(i) Control of the condensate system from the condenser 100 to the deaerator 103, and the sea water system used for cooling condensed water.

(ii) Control of the feed water system from the exit side of the deaerator 103 to the high pressure heater 105.

(iii) Control of the system from the feed water at the entrance of the boiler 106 to the steam line 106b on the exit side, the fuel system of the burner for carrying out combustion, and the air draft system.

(iv) Control of the system including the steam control valve 107 for controlling the main steam flow for rotating the turbine 109, the main steam stop valve 108, the turbine 109, and the condenser 100.

(v) Control for exciting the power generator 110 to take out a predetermined electric power to send it to the transmission line 114.

The configuration of a conventional control system including respective dedicated control devices used for operating the above-mentioned power generating unit is shown in FIG. 2.

An operator observes CRT display devices 11, 12 and 13 of an operator console board 1 to give an instruction to a process computer 2 from an operator input device 14 thus to send control signals to respective control devices 6 to 10 of the power generating unit through an input/output processing device 3 of the computer 2.

Further, the operator selects the control or operating switches and push buttons of instruments and/or display devices of the control board 4 while monitoring the state of the power generating unit, thus making it possible to similarly send operation signals for the respective control devices 6 to 10.

In order to start the power generating unit to operate or manipulate it as stated above on the basis of a system instrument or command so that a target load is provided, and to carry out a necessary stop operation depending upon circumstances, a plurality of operators share the manipulation of a large number of operation switches and/or push-buttons by using the control board 4 shown in FIG. 2. Alternatively, an operator gives operation instructions from the operator console board 1 to the process computer 2 while monitoring the plant by means of the CRT display devices provided in the operator console board 1. Thus, control signals are sent to the respective control devices 6 to 10 through the input/output control board 5 or the input/output processing device 3, and inputs for the supervisory control of the plant are taken into the system.

However, with respect to the starting of the power generating unit, there are several kinds of starting patterns in accordance with how many days the power generating unit is stopped. Accordingly, in correspondence with these starting patterns, the power generating unit must be controlled by different operation procedures, respectively.

Furthermore, controls based on various different procedures are conducted in order to optimize the efficiencies of the fuel and the power in correspondence with four kinds of starting modes (very hot, hot, warm and cold) scheduled in advance so as to optimize the starting time.

If an attempt is made to operate the power generating plant by using a conventional control system as stated above, a large scale control system and a plurality of operators for controlling that system are required. As a result, the equipment required therefor and the expense for ensuring the personnel requirement become costly.

In order to operate a plurality of units of the power generating plant by using such a large number of operators and large scale automatic system, a large amount of equipment investment and expenses for educating a large number of operators and maintaining them are required.

It is to be noted that while the invention of the distributed control system is applied to the different type of a power generating plant which is the combined cycle plant being consisted of a gas turbine, a heat recovery boiler and a steam turbine, the technology for collectively operating and controlling relatively small amount of power generated by the combined cycle plant having a plurality of generating units is already disclosed by the inventor of this application which has been issued as U.S. Pat. No. 4,550,379.

SUMMARY OF THE INVENTION

An object of this invention is to provide a system for controlling a power generating plant in which a simplified operating procedure for reducing such large costs and expenses is realized with a simplified control system.

A control system for a power generating plant according to this invention is directed to a power generating plant control system for collectively operating and controlling a power generating plant having a plurality of generating units, which comprises unit controllers provided in correspondence with the respective generating units, and having control logic for carrying out exclusive operations with respect to control systems of the respective generating units; data servers provided in correspondence with the respective generating units, and for processing and retaining control data and supervisory data of the respective generating units; and a central supervisory control system adapted to input data from the respective data servers through a data bus to carry out supervisory control of the operating states of the respective generating units, and to give a start/stop instruction or command, or a load operating instruction or command to the respective generating units in dependency upon how the electric power system is used.

In this invention, there are provided unit controllers having control logic of corresponding control system groups with respect to the respective generating units to simplify the operating mode and the control logic of the unit controllers. Thus, by simple instructions of starting, stopping and load operating given from the central supervisory control system, the power generating plant is operated.

As described above, in accordance with this invention, it is possible for simple devices and a smaller number of operators although about 10 to 20 operators to control a large scale control system which were conventionally required in carrying out the complicated starting and stopping operations by using conventional unit controllers. Thus, the operating equipment and the cost of the power generating plant can be advantageous from an economical point of view.

DETAILED DESCRIPTION OF THE PREFERRED EMBODIMENT

A preferred embodiment of this invention will now be described with reference to the attached drawings.

Figure 3:
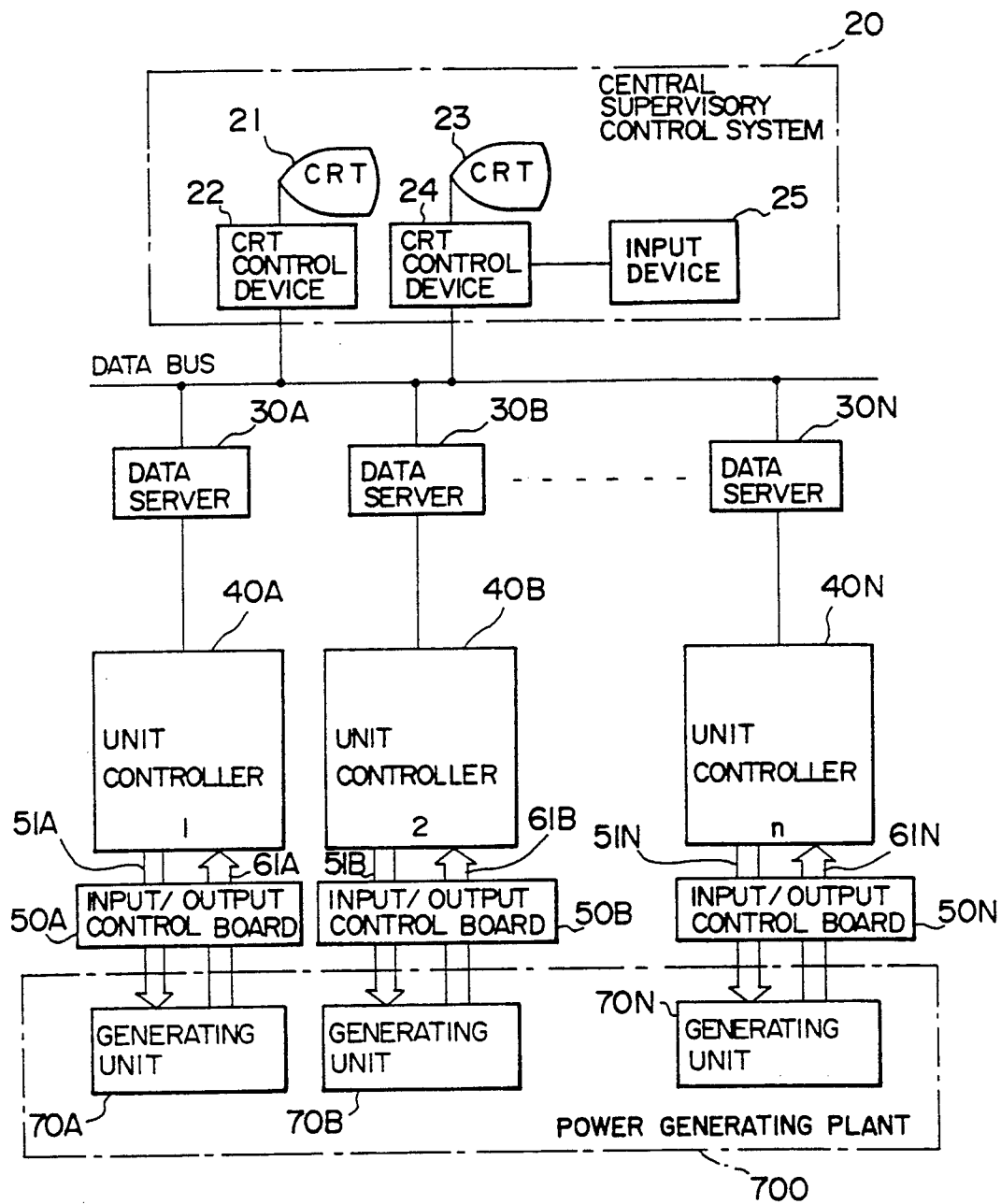
FIG. 3 is a block diagram showing the entirety of a system for controlling a power generating plant by a distributed computer system according to an embodiment of this invention.

FIG. 3 is a block diagram showing a control system for a power generating plant according to an embodiment of this invention. As shown in FIG. 3, the power generating plant control system of this invention comprises unit controllers 40A, 40B . . . 40N serving as control devices for operating a power generating plant 700 comprised of a plurality of generating units 70A, 70B . . . 70N; input/output control boards 50A, 50B, . . . 50N for carrying out input/output of signals between the unit controllers 40A, 40B, . . 40N and the generating units 70A, 70B, . . . 70N; data servers 30A, 30B . . . 30N for retaining control data and supervisory data for the unit operation of the respective generating units 70A, 70B, . . . 70N, and a central supervisory control system 20 for carrying out transmission and reception of data between the central supervisory control system 20 and the data servers 30A, 30B . . . 30N. In the case where explanation is given in connection with one unit, only reference numerals will be used without reference symbols A to N as suffix.

Respective unit controllers 40 carry out the supervisory control processing by process input signals 61 from the generating units to send outputs 51 such as operation instructions to the respective generating unit 70.

Data such as process input signals 61, etc. processed in the unit controllers 40 are retained in the respective data serves 30. The data thus retained are subjected to transmission and reception between the data servers 30 and the central supervisory control system 20 through the data bus commonly connecting respective data servers 30.

The central supervisory control system 20 includes CRT display devices 21 and 23 and an operation input device 25 used for the above-mentioned control for generating units. The CRT display devices 21, 23 and 25 are connected to the data bus through CRT control devices 22 and 24, etc. thereby making it possible to instruct the operations of all the generating units 70 thus to monitor the state of the process.

In order to carry out starting, load operation and stopping with respect to all the generating units 70, an operator selects a generating unit subject to operation by means of the operation input device 25 to allow the CRT display devices 21 and 23 to display thereon a necessary state and/or data of the plant to give an operation instruction. Instructions necessary for operating the power generating plant and/or process data necessary for monitoring it are transmitted to the data server 30 of a specific generating unit 70 and are received therefrom through the data bus.

The operation instruction is sent to the unit controller 40 by means of the data server 30, at which it is converted to data for control. The controller 40 generates a control signal. The control signal thus obtained is sent to the generating unit 70.

By means of the generating unit 70, a necessary process state is taken into the unit controller 40 as an input signal 61, at which it is converted to input data. The input data thus obtained is displayed in various forms on the CRT display devices 21 and 23 through the data server 30 and the data bus.

In order to control the generating unit 70 to thereby provide a necessary generated output, it is required to operate, in accordance with a scheduled procedure, equipments belonging to various power generating plants for the condensate/feed water system for feeding water to the boiler, the turbine driven by steam flow from the boiler, the generator connected to the turbine through the shaft, and the excitation of the generator or an electric control of a generated electric output, etc. must be operated.

Figure 4:
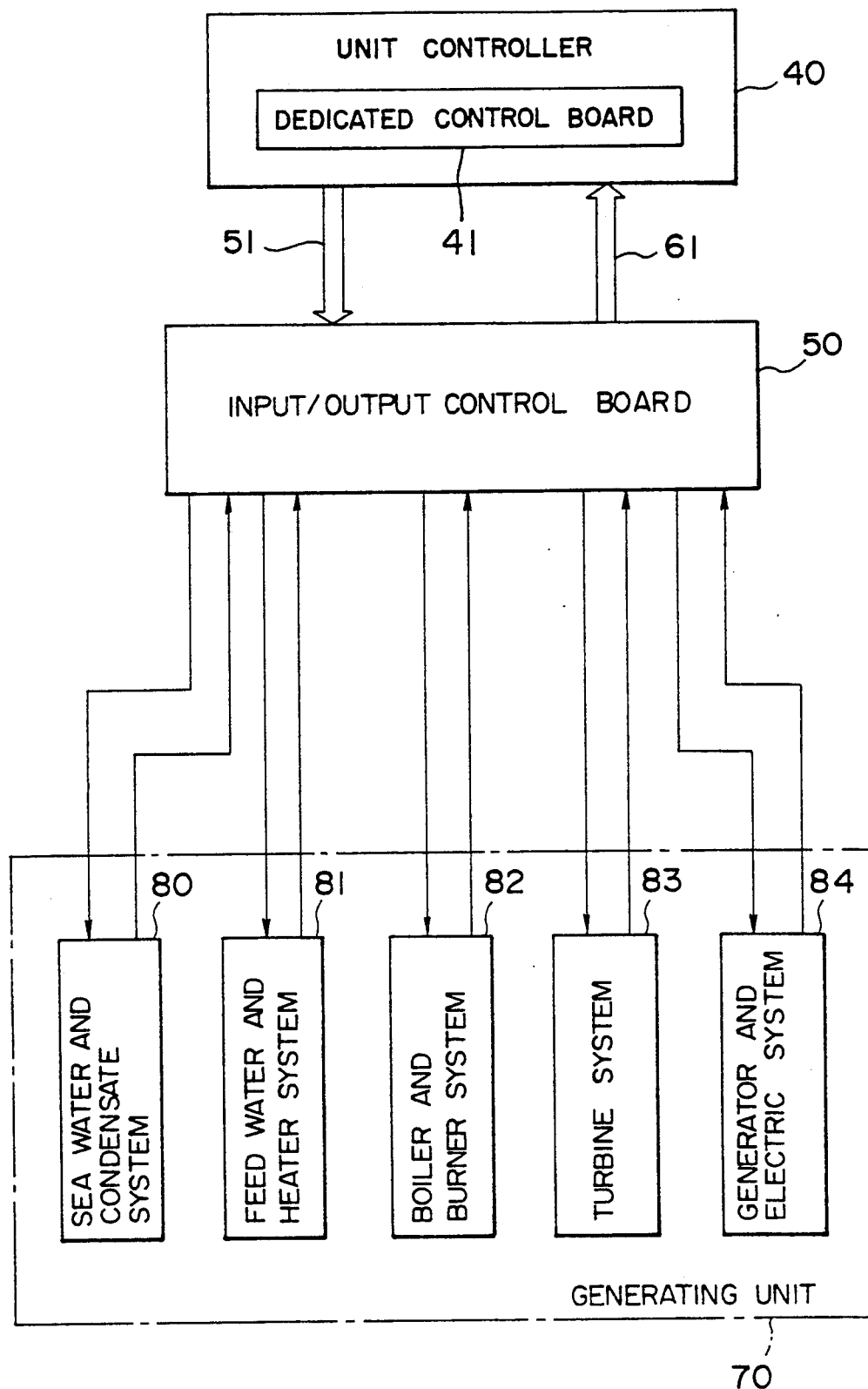
FIG. 4 is a block diagram showing the detail of controls of respective generating units in the control system according to the embodiment shown in FIG. 3.

Each unit controller 40 serves to control all equipments necessary for operating such a generating unit 70. FIG. 4 shows the detail of the control system of the generating unit 70. The unit controller 40 is comprised of a single control device of a simple structure in which appropriate operating procedures for the two stop/start mode selected with respect to a group of equipments constituting the generating unit 70 of "sea water/condensate system 80", "feed water/heater system 81" boiler/burner system 82", "turbine system 83" and "generator/electric system 84" is stored.

In accordance with the operating procedure stored in the control device constituting the unit controller 40, an operation output 51 is sent to the input/output control board 50. In the input/output control board 50, that operation output is converted to an operation signal caused to be in correspondence with equipments of the respective systems 80 to 84 of the generating unit 70 to be controlled.

A signal indicative of the operation of each equipment of the respective systems is sent as a process input signal to the input/output control board 50, at which it is converted to a signal suitable for processing by the control device of the unit controller 40. The signal thus obtained is amplified, and is then sent to the unit controller 40 as a plant input signal 61.

Here, in this invention, in order to permit a plurality of generating units 70 to be subjected to starting, stopping and load operation by an exclusive single unit controller 40, an approach is employed to store programs of one or two operation procedures to operate the respective generating units 70 in accordance with a standard procedure stored into the memories of the unit controllers 40 thus to carry out starting, load operation and stopping of respective generating units 70 only by the procedure stored therein.

Meanwhile, a microprocessor (CPU) used in this unit controller 40 has a memory capacity of 10 times, desirably 16 times, larger than that of the CPU used in various exclusive control devices in the prior art and a computation speed several times greater than that can be used. For this reason, the control logic usually be stored into the individual exclusive control devices is permitted to be stored into a single unit controller 40.

Further, in the case of the conventional unit operation, an operator outputs operation instructions to the various control devices based upon the states of the generating units 70, or an approach is employed to allow the process computer to store programs thereinto in order to automatically give operation instructions and to execute them.

On the contrary, in this invention, the operation or manipulation procedure at the time of starting and stopping the unit is simplified to limit the method to a method in which the manipulation procedure is fixed to one or two patterns, thus saving the memory capacity of the CPU. Accordingly, it is possible to program the manipulation procedure for starting and stopping and store it into the memory of the unit controller 40.

Figure 1:
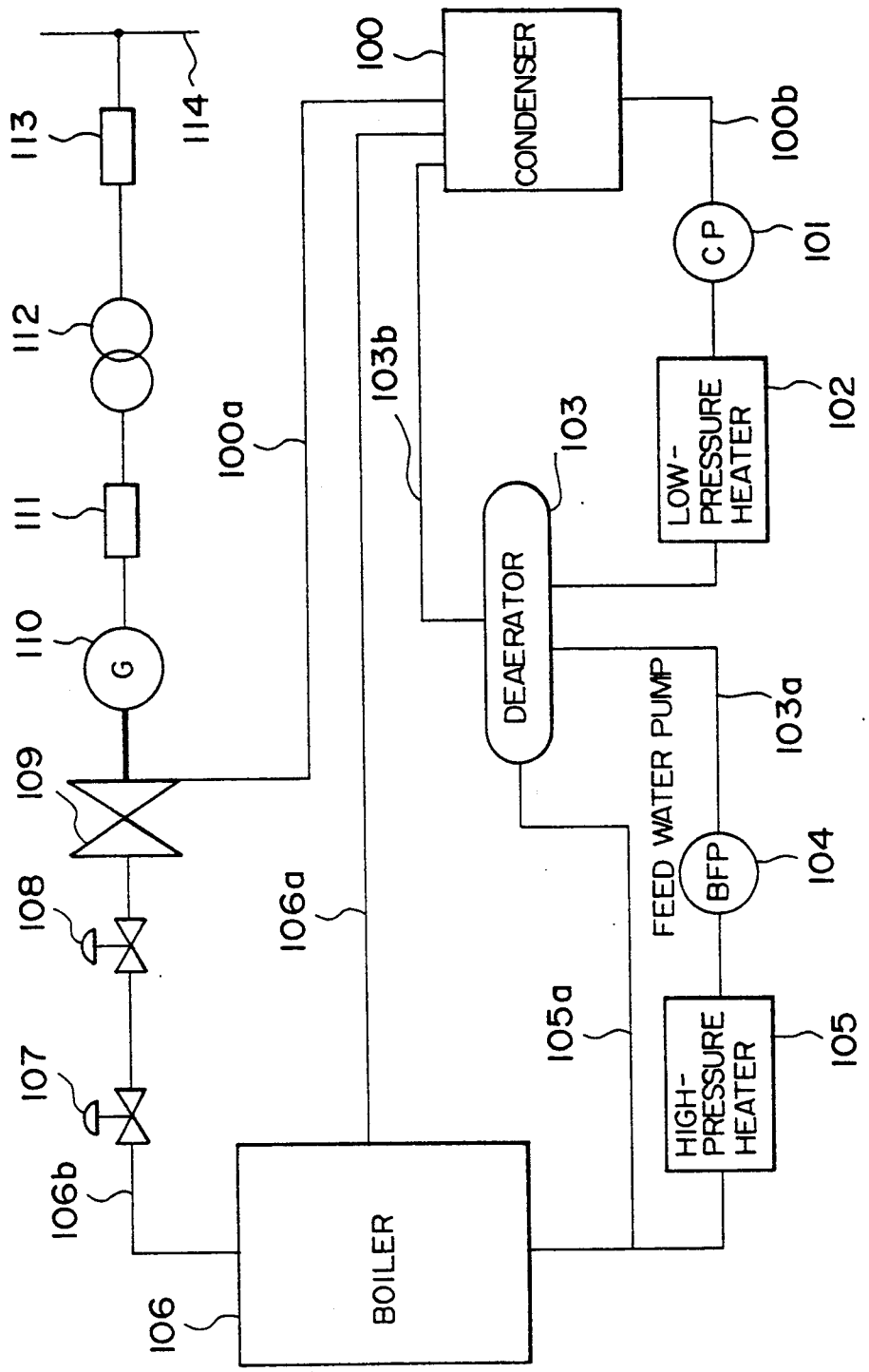
FIG. 1 is a block diagram showing the entirety of a typical power generating plant comprised of a plurality of generating units.
Figure 2:
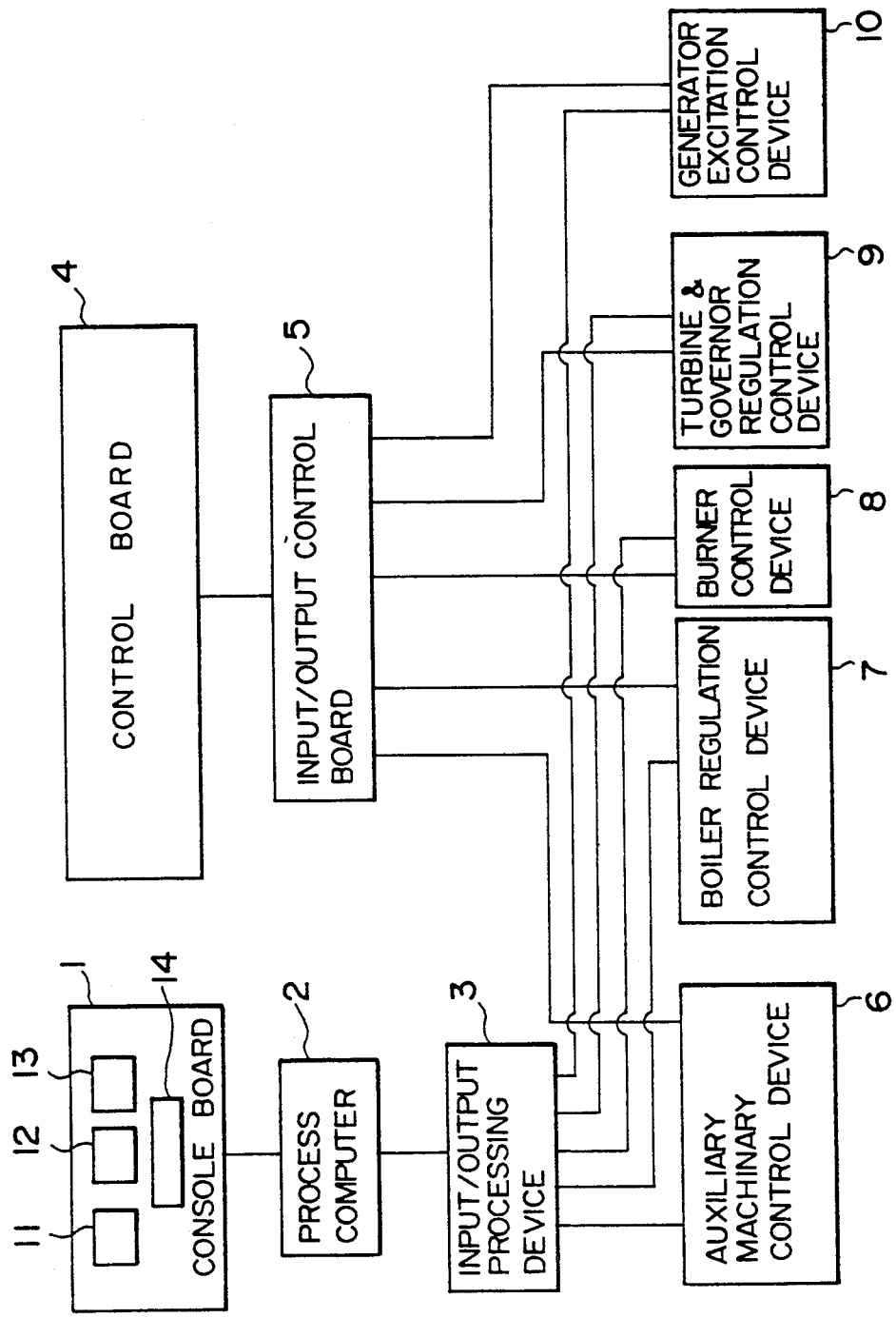
FIG. 2 is a block diagram showing a conventional supervisory control system for a power generating plant.

Furthermore, as shown in FIG. 1, there are actually a large number of equipments when attention is drawn to the entirety of the generating unit 70. Namely, for the motor, two manipulations of starting/stopping are required, and for the valve, two manipulations of open/close are required. Accordingly, it is necessary to use an extremely large number of operation terminals and control logic. In view of this, an approach is employed to use a hardware operating as an exclusive logic on a circuit board including ROM and the computation chip combined to assume related operation terminals as a group to allow the ROM on the circuit board to store the control logic, thereby to further reduce the memory use by the CPU. Thus, the possibility that processing can be conducted by the single unit controller 40 is increased.

In the block diagram showing the entire plant shown in FIG. 1, explanation will now be given by way of an example of the condensate line 100b from the condenser exit, the condensate pump 101, the low pressure heater 102, the deaerator 103, and the deaerator circulation line 103b. The deaerator circulation line belongs to the sea water/condensed water system in the generating unit of FIG. 4.

Figure 5:
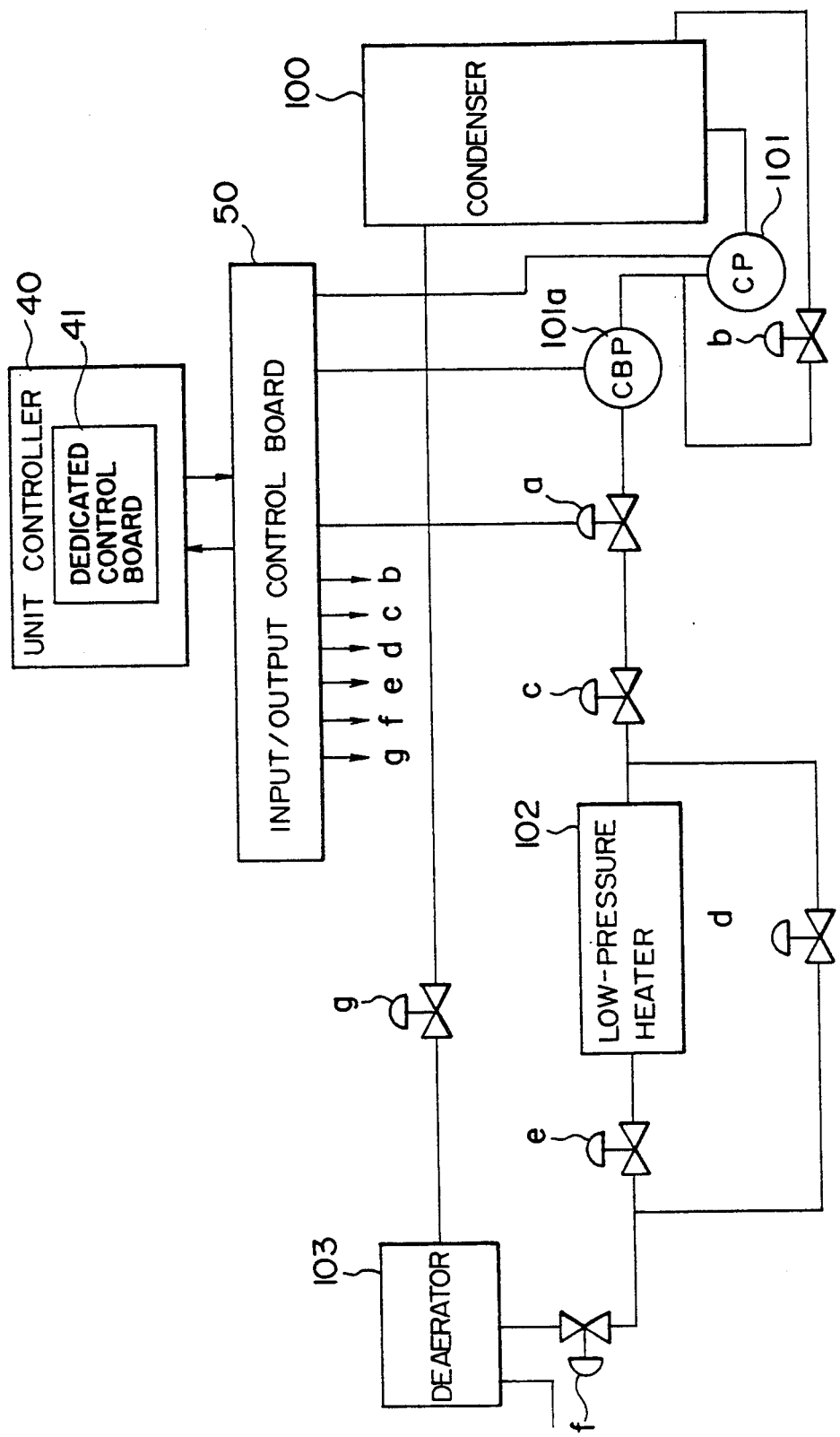
FIG. 5 is a block diagram showing the detail of the control of the deaerator circulation line in the control system according to the embodiment shown in FIG. 3.

In this deaerator circulation line, there are in practice operation ends for pumps and valves as shown in FIG. 5, and they can be assumed as one group.

In the control system for the deaerator circulation line to feed out water from the condenser (COND) 100 by using the condensate pump (CP) 101 and a condensate booster pump (CBP) 101a to feed water from the deaerator (DEA) 103 through the low-pressure heater (LP-HTR) 102 back to the condenser 100, a predetermined operation or manipulation is carried out by an exclusive control board 41 in which the necessary control logic is stored in the unit controller 40 and the input/output control board (IOP) 50 for processing a process input/output signal of this control system.

The operation procedure of this system is put in order and is classified into two cases.

One case is where the time period after the generating unit 70 is stopped is more than two days, and the generating unit is started after the circulation of water in the deaerator circulation line has stopped.

In this case #1, the operation of pump or the deaerator of the system is stopped thus to interrupt circulation of water. Thus, in starting the unit, the condensate booster pump 101a and the condensate pump 101 are started to operate the demineralizing or desalting device provided between the condensate pump 101 and the low-pressure heater 102 while opening and closing in succession valves a, b, c, d, e, f and g of the system thus to constitute the circulation of water shown in FIG. 5 while operating the deaerator 103 as well.

The second case #2 is where the system of the deaerator circulation line is constituted within two days after the unit is stopped, and necessary equipments are operated. In this case, the operating procedure is in a completed state, and improvement/maintenance of water quality in the system are carried out while monitoring the operation of the necessary equipments.

In the control board 41 of the unit controller 40, the manipulation procedure of case 2 is stored into the ROM to carry out any one of manipulations of case 1 and case 2 in accordance with an instruction from the controller 40.

The control board 41 sends an operating instruction to the condensate pump 101, the condensate booster pump 101a, and the valves a to g through the input/output control board 50 to receive an input signal for supervisory control also through the input/output control board 50.

In the case of stopping the generating unit 70, the output of the generator is caused to be zero in the entire plant of FIG. 1 to take off it from the transmission system. Then, the steam flow into the turbine 109 is interrupted to carry out the turbine trip and the burner extinction of the boiler 106 to conduct stopping of the related pumps or the manipulation of the valves, thus to allow the system to be placed in the state before the unit is started. At this time, the stop mode is permitted to be selected in connection with both case 1 and case 2. An instruction is given to the control systems 80 to 84 of FIG. 4 based upon the necessary stop time period to control the generating unit 70 so that it is placed in a target stopped state.

As shown in FIG. 4, the unit controller 40 is such that the groups of operation ends like the control group of the deaerator circulation line shown in FIG. 5 are provided with respect to the respective control systems 80 to 84 in order to carry out the operating manipulation of the generating unit 70, and that it is provided with dedicated control boards 41 as shown in FIG. 5 respectively corresponding thereto.

As the group of the operation ends, the system is classified as follows:
(1) Condenser sea water system
(2) Deaerator circulation system
(3) Feed water pump control system
(4) High-pressure heater control system
(5) Boiler feed water circulation system
(6) Boiler air draft control system
(7) Boiler fuel control system
(8) Burner control system
(9) Boiler temperature elevation and steam temperature control system
(10) Turbine control system
(11) Generator/excitation control system
(12) House power control system
(13) Water quality sampling/chemicals injection system In addition to the above, in the case of the coal thermal power generation, the following grouping is required.
(14) Coal feeder/mill control system
(15) Stack-gasor fuel gas desulfurization control system Further, in the case of the petroleum thermal power generation, the following grouping is required.
(16) Desulfurization device control system Furthermore, in the case of the Liquefied Natural Gas (LNG), the following grouping is required.
(17) Gas carburetor/supply control system.

Various dedicated boards 41 in which respective special purpose control logic is stored in a ROM are provided in the unit controller 40 to judge the operating mode of the generating unit 70 or a request from the electric power control system to determine the operating manipulation procedure and give necessary manipulation instructions to the dedicated control boards 41 of the above-mentioned respective systems labeled (1) to (17) thus carrying out the control of the respective groups.

Figure 6:
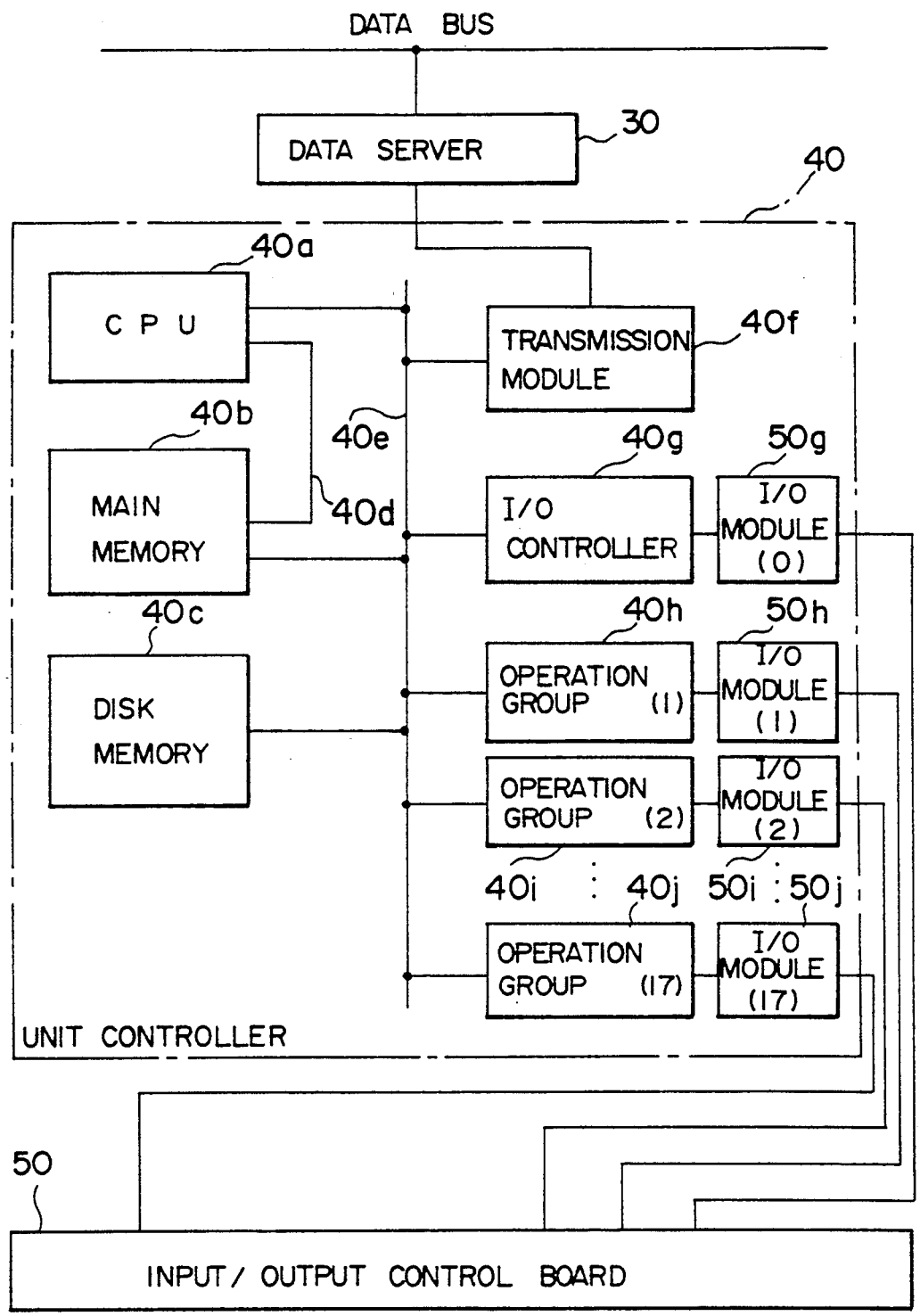
FIG. 6 is a block diagram showing the detailed configuration of respective unit controllers in the control system according to the embodiment shown in FIG. 3.

FIG. 6 shows the detail of the unit controller 40. As shown in FIG. 6, the unit controller (UC) 40 allows the data server 30 to receive data necessary for operating the unit to be controlled by using the data bus. The transmission module 40f receives data such as the operating pattern of the start/stop instruction, the operating starting time, and the target generated output of the generating unit 70 transmitted from the central supervisory control system 20 through the data server 30, and stores it into the main memory 40b.

The microprocessor (CPU) 40a transfers a necessary control logic from the disk memory 40c to the main memory 40b via a memory bus 40d on the basis of information read out from the main memory 40b to execute it.

This control logic has a procedure necessary for operating the unit to be controlled to prepare, on the basis of judgment of the above-mentioned procedure, signals sent to the respective control systems of the unit.

An operator grasps the operating state of the respective generating units by using the CRT display devices 21 and 23 of the central supervisory control system to judge which generating unit 70 is to be started or stopped.

Then, by using the manipulation input device 25, instructions to respective generating units 70 to be started, stopped or subjected to load operating are transmitted to the unit controller 40 through the data bus and the data server 30.

Either of two patterns is designated with respect to the generating unit 70 to be stopped in connection with a set value of the target generated output or the time schedule for stopping equipment such as the generator, the turbine or the boiler, etc.

The pattern 1 corresponds to the case 1 where the time until this unit is started again is more than two days. In this case, all the equipments shown in FIG. 5 are stopped, or the operating state is again placed in the state before the above-described deaerator circulation line of FIG. 5.

The pattern 2 corresponds to the case where the time until the unit is started again is within two days. In FIG. 5, the systems from the deaerator circulation line to the systems succeeding thereto, i.e., feed water, heater, and boiler circulation systems are all constituted. Namely, this state is the state immediately shifting to the burner ignition of the boiler. When this pattern is given, the unit controller of the corresponding generating unit sends manipulation instructions via a data bus 40e to the I/O controller 40g, the I/O module 50g, the respective manipulation groups 40h to 40j, and the respective I/O modules 50h to 50j thereof in accordance with an operating manipulation procedure provided in the control logic of the main memory 40b and the disk memory 40c shown in FIG. 6 to control the generating so that it is placed in a predetermined stopped state.

On the other hand, with respect to a generating unit 70 to be started, the unit controller 40 can judge the stopped state thereof at that time from the input and the content of the memory. Thus, the starting pattern is determined.

In the case where the stopping pattern is the pattern 1, from the group manipulation of the deaerator sea water system, the manipulation groups 40g to 40j, and 50g to 50j of FIG. 6 are sequentially controlled.

In the case of the pattern 2, the group manipulation succeeding the deaerator circulation line system is controlled in the same manner as in the pattern 1. In either pattern, the time schedule for the main equipments to be started is determined in advance. Thus, the arrival time of a target generated output can be scheduled.

By such a simplified stopping/starting pattern, respective generating units are operated on the basis of the central power dispatching demand of the power transmission system. Further, with respect to the unit subject to load operating, by using the CRT display device and the manipulation input device, a target output is instructed to the unit controller 40 by data transmission. Thus, a required output generated can be realized.

An operator displays and monitors the operating states of a necessary unit or units of the respective units on the screen of the CRT display device 11 and 21. Data to be displayed is periodically scanned or gathered from all the I/O modules of the unit controller 40. The input data is temporarily retained and is updated. Necessary data of a designated unit is selected from the manipulation input device 25. The data thus designated is transmitted from the data server 30 to the CRT control devices 22 and 24 via the data bus, and is then displayed on the CRT display devices 21 and 23.

What is claimed is:

1. A power generating plant control apparatus, comprising:

a) central supervisory control means for carrying out supervisory control of the operating states of individual generating units constituting a power generating plant by giving instructions necessary for operating said individual generating units in accordance with the usage of an electrical system;
b) a plurality of memory means provided in each of said individual generating units for storing data necessary to operate said individual generating units;
c) transmission means provided between said central supervisory control means and said plurality of memory means for transmitting said instructions and said data necessary for operating said individual generating units; and
d) a plurality of unit control means for collectively operating and controlling said plurality of generating units to control a plurality of operation end groups which are respectively unified to each related operation by using a control logic and applying dedicated operations to said operation end groups, individual unit control means of said plurality of unit control means comprising a storage portion for storing said control logic with a predetermined number of patterns of every individual one of said operation end groups, and a calculation portion for independently selecting said control logic of one of said patterns for each of said operation end groups from said patterns stored in said storage portion on the basis of said instructions supplied from said central supervisory control means through said transmission means, wherein said central supervisory control means, said transmission means, and said plurality of memory means and said plurality of unit control means of said individual generating units, are organically combined with each other in the manner that:

i) said instructions from said central supervisory control means are supplied to an individual memory means of said plurality of memory means through said transmission means;
ii) said data stored in said individual memory means are read out from said central supervisory control means through said transmission means;
iii) said individual unit control means processes and executes the control logic of said instructions from said central supervisory control means; and
iv) a monitor display provided in said central supervisory control means displays information related to processing and execution of said individual unit control means.

2. The power generating plant control apparatus according to claim 1, wherein said unit control means includes said control logic as a program for starting, stopping and load operating said generating units, and further includes a dedicated control board for storing said control logic to perform a predetermined processing on the basis of said instructions provided from said operation end groups.

3. The power generating plant control apparatus according to claim 1, wherein said operation end groups in said individual generating units are classified into a plurality of operation end groups, said groups including a deaerator/sea-water system, a deaerator circulation system, a feed water pump control system, a high-pressure heater control system, a boiler feed water circulation system, a boiler ventilating control system, a boiler fuel control system, a burner control system, a boilertemperature-elevation/steam-temperature control system, a turbine control system, a generator/excitation control system, a system for controlling electrical power in the plant, and a water-quantity-sampling/chemicals-injection system, and wherein said power generating plant is applied to a thermal power generating plant.

4. The power generating plant control apparatus according to claim 1, wherein said apparatus is applied specifically to a coal thermal power generating plant, in which there are included a coal-supply-machine/mill control system and a fuel gas desulfurization control system as said operation end groups in said control system.

5. The power generating plant control apparatus according to claim 4, wherein said power generating plant control apparatus is applied specifically to a petroleum thermal power generating plant, in which a desulfurization control system is included as said operation end groups.

6. The power generating plant control apparatus according to claim 4, wherein said power generating plant control apparatus is applied specifically to a liquified natural gas (LNG) thermal power generating plant, in which a gas carburetor/supply control system is included as said operation end groups of said control apparatus.

* * * * *